United States Patent Office 3,514,580
Patented May 26, 1970

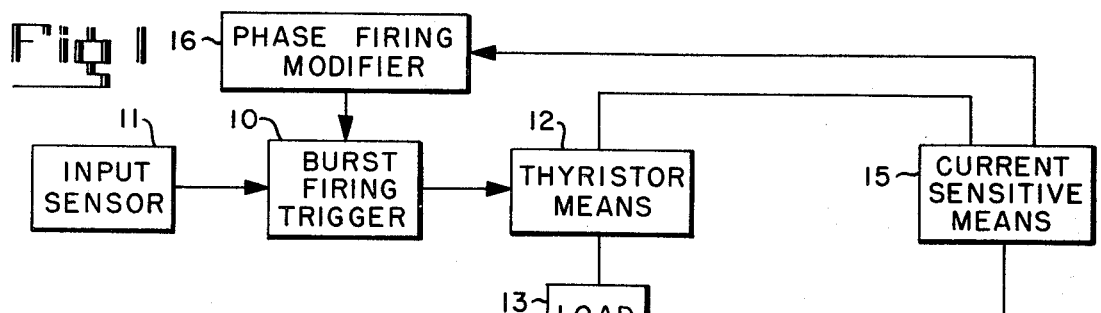
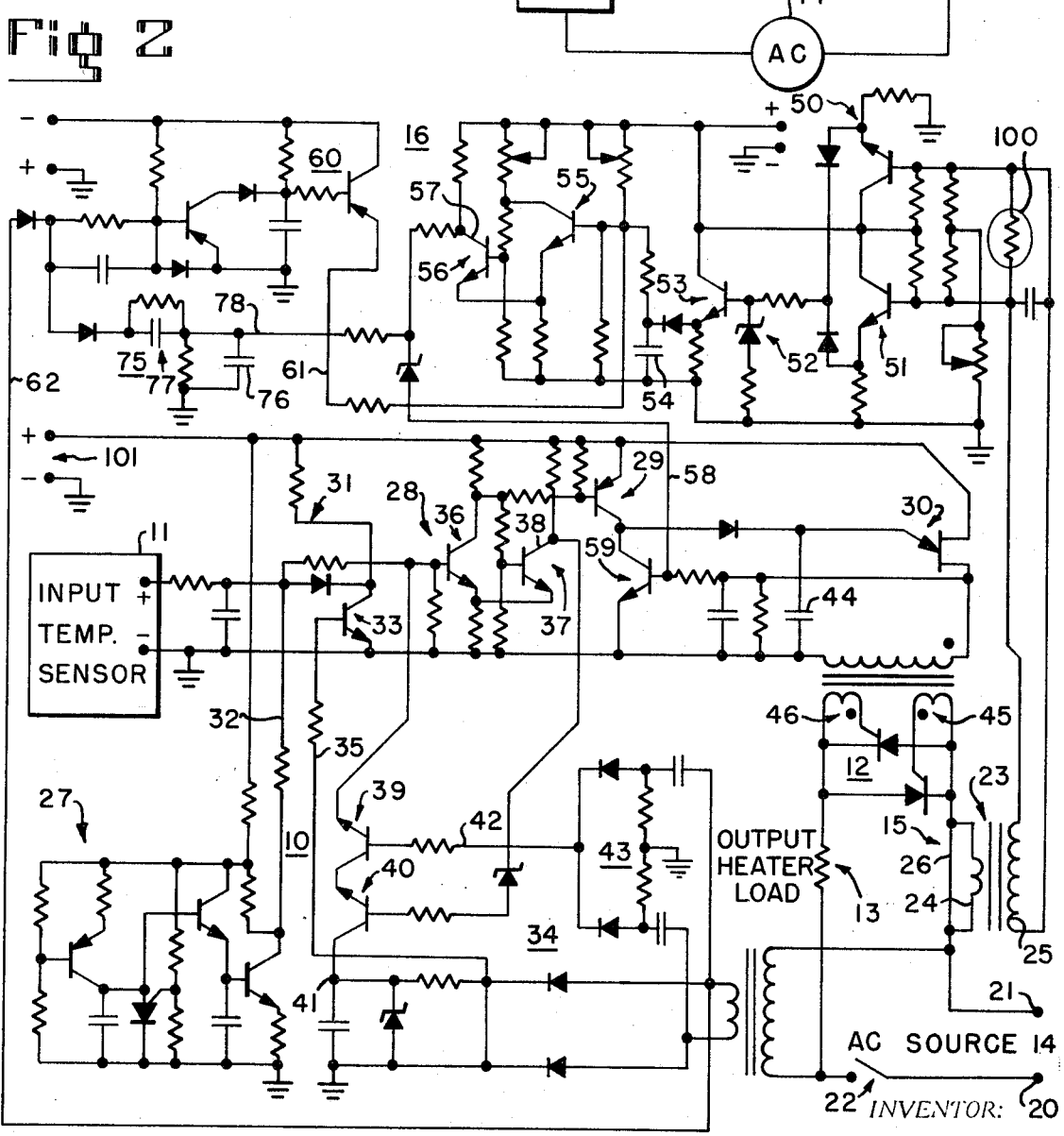

3,514,580
BURST FIRING CONTROL APPARATUS WITH SOFT START
Robert M. Brockway, Edina, Minn., assignor to Honeywell Inc., Minneapolis, Minn., a corporation of Delaware
Filed July 12, 1968, Ser. No. 744,378
Int. Cl. H05b *1/02*
U.S. Cl. 219—482                    11 Claims

ABSTRACT OF THE DISCLOSURE

Apparatus for burst firing thyristor means to modulate the alternating current energization of a positive temperature coefficient load, with a transformer to sense the load current which flows during the initial portion of a burst, to produce phase firing and reduced load current when the initial load current is too high, and to subsequent revert to burst firing when the load resistance has increased.

BACKGROUND OF THE INVENTION

Soft starting of positive temperature coefficient loads has been achieved by manually controlling the energization thereof until the load is hot, and then subsequently automatically controlling the temperature of the load by means of either a phase firing or a burst firing control apparatus. Phase firing controllers have been constructed to automatically soft start the load, either by sensing load current or by the use of a timed soft start where the timing begins upon applicaion of power to the load. U.S. Pat. 3,310,656 to H. R. Sproul shows a method of automatically soft starting a positive temperature coefficient load.

SUMMARY OF THE INVENTION

My invention provides a burst firing control apparatus which automatically soft starts the load. I provide a current sensitive means which provides an output indicative of the magnitude of load current. So long as the output is below a given level, my control apparatus operates in a burst fire mode. If the load current is too high, my control apparatus operates in a phase fire mode until the load resistance increases sufficiently to cause the load current to drop.

More specifically, I utilize a transformer and a rectifier network to originate a positive voltage whose magnitude is indicative of load current. This positive voltage is summed with a negative-going ramp voltage, the ramp voltage being synchronized to an alternating current source. In the event of a high initial load current, for each cycle of the alternating current source, and at the time that the ramp has risen to oppose the positive voltage, the thyristor means is allowed to fire. With a normal load current, and thus a low positive voltage, the thrysitor means fires at 0° and 180°, and burst firing is achieved. When the load current is too high, the thyristor means fires for only a portion of each half cycle, and load energization gradually increases as the load resistance increases, until the burst firing mode is restored.

BRIEF DESCRIPTION OF THE DRAWING

FIG. 1 is a block diagram showing a preferred embodi- of my invention, and

FIG. 2 is a circuit diagram showing of the structure of FIG. 1.

DESCRIPTION OF THE PREFERRED EMBODIMENT

Referring to FIG. 1, a burst firing trigger 10 has an input adapted to be connected to an input sensor 11. The output of trigger 10 is connected to control the firing of thyristor means 12. Thyristor means 12 may take the form of a pair of back-to-back connected SCR's, as in FIG. 2, or a Triac. Thyristor means 12 is connected in series with a positive temperature coefficient load 13 and a source of alternating current 14. Load 13 may be a heater located to heat the area at which sensor 11 is located.

By definition, the burst firing trigger mode causes thyristor means 12 to fire at the beginning of each half cycle of source 14. The length of the burst is variable to modulate energization of load 13, the load always receiving full half cycles of energization.

Current sensitive means 15 is connected in series with thyristor means 12 to sense the current which flows in the series circuit 12, 13 and 14. Current sensitive means 15 is constructed and arranged to be sensitive to a given current magnitude to provide an output to a phase firing modifier 16 in the event that the load current is too high. The output of modifier 13 is connected to trigger 10 to cause the trigger to operate in a manner to produce a phase firing mode of thyristor means 12.

The smallest amount of energy which can be applied to load 13 by a burst firing mode is a half cycle of source 14. Even this may be excessive energy if load 13 is cold. Thus, under a cold starting condition current sensitive means 15 responds to the excessive current which initially flows due to a short burst firing period, preferably one-half cycle of operation of trigger 10 to cause modifier 16 to operate and convert operation of thyristor means 12 to the phase firing mode. In the phase firing mode, thyristor means 12 can be operated for only a portion of each half cycle of source 14. As the load heats up and as its resistance increases, the firing phase angle is modified to increased the energy applied to the load, until the load is hot and the current sensitive means 15 no longer responds to an excessive load current. At this time modifier 16 is no longer operative, and trigger 10 then reverts to the burst firing mode where the burst firing of thyristor means 12 is modulated in accordance with input sensor 11 to maintain the temperature of the area wherein sensor 11 and load 13 are located.

By way of example, I have found that with a particular PTC load having a maximum operating current of 25 amperes it is desirable to provide current sensitive means 15 which is sensitive to a current which is ten percent greater than 25 amperes, and to then cause trigger 10 to revert to phase firing. The cold starting current of this load may be as high as ten times its maximum operating current, or 250 amperes. The initial energization of the load, in the burst firing mode, causes a half cycle of excessively high current to flow. Modifier 16 is effective to modify trigger 10 such that thyristor means 12 operates in the phase firing mode. This mode of operation continues for a relatively long time period, for example 60 seconds.

Referring to FIG. 2, the reference numerals of FIG. 1 have been applied to portions of the circuit diagram to identify corresponding structure.

Thyristor means 12 consists of two back-to-back connected SCR's, connected in series with output heater load 13 and current sensitive means 15 to AC source 14 having terminals 20 and 21. The application of power to the control apparatus is controlled by on-off switch 22.

Current sensitive means 15 comprises a step-up transformer 23 having a primary winding 24 and a secondary winding 25. I have found that a conventional step-up transformer can be utilized by connecting primary winding 24 across approximately 9 inches of number 14 wire, identified by reference numeral 26, with primary winding 24 having 75 turns and secondary winding 25 having 3,000 turns. A thermistor 100 is connected across the secondary winding to compensate for ambient temperature changes in wire 26.

Trigger 10 of FIG. 2 comprises a ramp generator 27, a gate 31, a Schmitt trigger 28, an output stage 29, and a unijunction oscillator 30.

The output of ramp generator 27 (conductor 33) consists of a negative going ramp of a frequency of from one-half cycle per second to 5 cycles per second. This negative going ramp is summed with the positive output of temperature sensor 11 as the input to Schmitt trigger 28. The length of a firing burst is proportional to the magnitude of the output voltage of temperature sensor 11. Thus, when the heating requirement for heater 13 increases, the output voltage of temperature sensor 11 increases, producing a longer period of burst firing of thyristor means 12.

In order for Schmitt trigger 28 to switch from its stable state to its unstable state, it is necessary that gate 31 be in a proper condition with transistor 33 nonconductive and the summation of the output of ramp 27 and temperature sensor 11 sufficiently positive. Initially in each cycle of generator 27 Schmitt trigger 28 may be rendered in its unstable state by the sensor output. However, later on in the cycle when the negative ramp has increased, trigger 28 will switch to its stable state, the point of switching being controlled by the magnitude of the sensor output. Transistor 33 has its base electrode connected to the output of a full-wave unfiltered rectifier network 34. Network 34 is connected to source 14. The voltage on conductor 35 consists of unfiltered full-wave voltage which drops to zero magnitude at the 0° and 180° points of source 14. Thus, the only times that Schmitt trigger 28 can be switched from its stable to its unstable state are at the 0° and 180° points on the source waveform. However, switching does not take place at this time unless the output of sensor 11 is sufficiently positive.

With transistor 33 nonconductive and sufficient positive voltage applied to the base electrode of transistor 36, transistor 36 is rendered conductive. Conduction of transistor 36 renders transistor 37 nonconductive and the collector electrode 38 thereof then moves in a positive direction. This positive voltage is applied to a feedback network including a reset transistor 39 and a hold transistor 40 to apply a positive voltage from terminal 41 to the base electrode of transistor 36, thus maintaining Schmitt trigger 28 in the unstable state.

So long as Schmitt trigger 28 is in its unstable state, output transistor 29 is conductive.

The base electrode of reset transistor 39 is connected by conductor 42 to the output of a full-wave unfiltered rectifier which is connected to source 14 through a 20° phase shifting network 43. Thus, the voltage on conductor 42 consists of full wave rectified positive pulses which drop to zero magnitude at 160° and 340°. At 160° and 340° transistor 39 is rendered nonconductive, the above mentioned feedback network is interrupted, and Schmitt trigger 28 reverts to its stable state.

When the Schmitt trigger reverts to its stable state transistor 29 becomes nonconductive.

When transistor 29 is conductive, a charging circuit is completed from power supply 101 to charge capacitor 44 of unijunction oscillator 30. The construction of unijunction oscillator 30 is such that a seven kilocycle output is provided at transformer windings 45 and 46 so long as a charging circuit is completed for capacitor 44.

Thus, burst firing trigger 10 operates to produce firing of thyristor means 12 at the 0° and 180° portions of source 14. At 20° prior to the 0° and 180° points, reset transistor 39 is effective to interrupt the operation of unijunction oscillator 30 and the triggering pulses at windings 45 and 46 are interrupted. However, a switching decision is made 20° later and the burst firing of thyristor means 12 continues if sensor 11 continues to call for energization of load 13. In the burst firing mode, load 13 is always initially energized at zero crossover of the voltage waveform and is always deenergized after a full half cycle of energization.

Phase firing modifier 16 of FIG. 2 receives its input voltage from secondary winding 25. This winding is connected across the base electrodes of transistors 50 and 51. The signal at each emitter is half wave rectified and summed into the base of transistor 53. Thus a full wave rectified DC signal appears at the base of transistor 53 and is the analog of the load current through 13. Zener diode 52 causes an increased attenuation at high load currents. This voltage is applied to the base electrode of transistor 53. With capacitor 54 in a discharged state, transistor 55 is nonconductive and transistor 56 is conductive. With transistor 56 conductive, its collector electrode 57 is at a low potential level and the signal present on conductor 58 causes transistor 59 to be nonconductive. The condition of transistor 59 is the output signal of phase firing modifier 16 and this transistor constitutes a voltage sensitive switch.

The voltage present on capacitor 54 is compared to the output of a ramp generator 60, this output existing on conductor 61. Ramp generator 60 is synchronized to source 14 by means of conductor 62 and the output waveform on conductor 61 consists of a negative going ramp whose time duration of 180° and whose minimum voltage appears at 0° and at 180°, rising in magnitude in a negative manner during the 180° time duration of each ramp.

This negative going ramp is summed with the positive voltage present on capacitor 54. The larger the positive voltage on capacitor 54, the later in the half cycle of source 14 in which transistor 55 is rendered nonconductive. In other words, a higher load current causes a larger magnitude positive voltage on capacitor 54 and this voltage is summed with the negative ramp voltage on conductor 61 to render transistor 55 nonconductive at a later time in the half cycle of source 14. When the transistor 55 is rendered nonconductive, transistor 56 is rendered conductive and a negative voltage pulse is applied by way of conductor 58 to the base electrode of transistor 59, causing transistor 59 to be rendered conductive.

When transistor 59 is in its conductive state, charging of capacitor 44 is prevented and no triggering pulses are developed at secondary windings 45 and 46. However, when transistor 59 is nonconductive, capacitor 44 charges and a seven kilocycle triggering pulse is developed in windings 45 and 46 to phase fire thyristor means 12 in accordance with the magnitude of voltage on capacitor 54.

The phase firing of thyristor means 12 causes load 13 to gradually increase in both temperature and resistance value thereby lowering the load current. With a lower load current, the charge on capacitor 54 reduces and the negative going ramp on conductor 61 is effective to render thyristor means 12 conductive at an earlier time in each half cycle of source 14. This process continues until the load resistance has increased to its operating range, whereupon the positive voltage on capacitor 54 is no longer effective to render transistor 59 conductive, even at the early portion of the half cycle of source 14. The burst firing trigger 10 is then effective to institute burst firing of thyristor means 12, under the control of input temperature sensor 11.

I have found that it is desirable to prevent premature firing of thyristor means 12 which may occur due to line transients produced by initial closing of on-off switch 22. To provide this function I utilize RC network 75 which combines a small value capacitor 76 and a large value capacitor 77 so as to initially apply a positive voltage to conductor 78 when switch 22 is first closed. This positive voltage is applied to conductor 58 to insure that transistor 59 will remain conductive for a short time period. After this short time period, burst firing trigger 12 is effective to energize thyristor means 12, either in the phase firing mode or in the burst firing mode, depending upon the magnitude of current being drawn through thyristor means 12.

The embodiments of the invention in which an exclusive property or right is claimed are defined as follows:

1. Control apparatus having input means adapted to be connected to condition sensing means, and having output means adapted to be connected to control the energization of condition changing means from a source of alternating current, the control apparatus comprising;
- output means including thyristor means connected to the source of alternating current and to the condition changing means such that conduction of said thyristor means results in energization of the condition changing means,
- trigger means having an input connected to said input means and having an output connected to control said thyristor means, said trigger means being constructed and arranged to produce burst firing of said thyristor means when the sensing means indicates a need for operation of the condition changing means,
- current sensitive means having an output and having an input connected in circuit with said thyristor means and responsive to a current flow through said thyristor means which is above a given magnitude,
- and means connecting said current sensitive means output to said trigger means in a manner to produce phase firing of said thyristor means and reduced current flow through said thyristor means when the current is initially above said given magnitude.

2. Control apparatus as defined in claim 1 wherein said current sensitive means comprises;
- means including said current sensitive means input to derive a voltage of a given polarity and of a magnitude indicative of the magnitude of the current flow through said thyristor means,
- a ramp generator adapted to be connected to the source of alternating current to produce a repetitive ramp voltage of an opposite polarity in synchronism with the source of alternating current, and
- means controlled by a summation of said voltage of said given polarity and said ramp voltage of said opposite polarity, and responsive to said voltage of said given polarity to provide said current sensitive means output.

3. Control apparatus as defined in claim 2 wherein said voltage of said given polarity is derived from a short period of burst firing of said thyristor means, whereupon said control apparatus reverts to phase firing when the current flow through said thyristor means is above said given magnitude during said short period, wherein the time duration of said ramp voltage is equal to 180° of the source of alternating current, and wherein the phase firing angle is determined by the magnitude of said voltage of said given polarity as compared to the magnitude of said ramp voltage.

4. Control apparatus as defined in claim 1 including
- disabling means adapted to be connected to the source of alternating current and responsive to initial energization of the control apparatus to originate an output of limited time duration, and
- means connecting said disabling means output to said trigger means to disable said trigger means for the duration of said output.

5. Control apparatus as defined in claim 2 including;
- disabling means adapted to be connected to the source of alternating current and responsive to initial energization of the control apparatus to originate an output voltage of said given polarity and of a limited time duration, and
- means connecting said disabling means output voltage to said trigger means to disable said trigger means for the duration of said output voltage.

6. Control apparatus as defined in claim 1 wherein said current sensitive means comprises;
- a low resistance electrical conductor connected in series with said thyristor means,
- a step up transformer having a primary winding connected across a portion of said conductor and having a secondary winding, and
- amplifier means having an input connected to said secondary winding, and having an output connected to said trigger means.

7. Control apparatus as defined in claim 1 wherein said trigger means comprises;
- oscillator means connected to said thyristor means to apply a triggering pulse thereto,
- switch means having a stable state and an unstable state, said switch means being connected to said oscillator means to cause oscillation when said switch means is in said unstable state,
- first disabling means synchronized to the source of alternating current and connected to said switch means to maintain said switch means in said stable state at all times other than approximately 0° and 180°,
- feedback means connected between the input and output of said switch means and effective to maintain said switch means in said unstable state, and
- second disabling means synchronized to the source of alternating current and connected to render said feedback means inoperative prior to 0° and 180°.

8. Control apparatus as defined in claim 7 wherein said trigger means includes unijunction oscillator means having a capacitor, and wherein said current sensitive means output includes a voltage sensitive switch connected to said capacitor to control the charging thereof in a manner to produce phase firing of said thyristor means.

9. Control apparatus as defined in claim 8 wherein said current sensitive means comprises;
- means including said current sensitive means input to derive a voltage of a given polarity and of magnitude indicative of the current flow through said thyristor means which results from a short period of burst firing of said thyristor means,
- a ramp generator synchronized to the source of alternating current to produce a repetitive ramp voltage of an opposite polarity, the time duration of said ramp voltage being 180°,
- and means summing said voltage of said given polarity and said ramp voltage to control said voltage sensitive switch.

10. Control apparatus as defined in claim 9 including;
- further disabling means responsive only to initial energization of the control apparatus to originate an output voltage of said given polarity and of a limited time duration, and
- means connecting said disabling means output to said voltage sensitive switch to disable said trigger means for the duration of said output voltage.

11. Control apparatus as defined in claim 10 wherein said current sensitive means comprises;
- a low resistance electrical conductor connected in series with said thyristor means,
- a step up transformer having a primary winding connected across a portion of said conductor and having a secondary winding, and
- amplifier means having an input connected to said secondary winding, and having an output to derive said voltage of said given polarity and of a magnitude indicative of the current flow through said thyristor means.

References Cited

UNITED STATES PATENTS

| | | | |
|---|---|---|---|
| 3,215,818 | 11/1965 | Deaton | 219—499 |
| 3,275,802 | 9/1966 | Vandiveris et al. | 219—501 |
| 3,371,231 | 2/1963 | Burley | 307—308 |
| 3,310,656 | 3/1967 | Sproul | 219—503 |

BERNARD A. GILHEANY, Primary Examiner

F. E. BELL, Assistant Examiner

U.S. Cl. X.R.

219—501, 505, 504